United States Patent [19]
Shanahan

[11] 3,971,543
[45] July 27, 1976

[54] TOOL AND KIT FOR ELECTRICAL FISHING

[76] Inventor: William F. Shanahan, 2306 S. 3rd St., Philadelphia, Pa. 19148

[22] Filed: Apr. 17, 1975

[21] Appl. No.: 569,146

[52] U.S. Cl. ................. 254/134.3 R; 166/65 R; 294/65.5
[51] Int. Cl.² ........................................ E21C 29/16
[58] Field of Search ............... 254/134.3 R; 166/65; 294/65.5; 335/306, 207

[56] References Cited
UNITED STATES PATENTS
3,078,073  2/1963  Zizzo ........................ 254/134.3 R Primary Examiner—Al Lawrence Smith
Assistant Examiner—Robert C. Watson
Attorney, Agent, or Firm—Seidel, Gonda & Goldhammer

[57] ABSTRACT

A tool for fishing electrical wires through walls includes a magnetically attractable sensor assembly having a contactor element secured through a connecting sleeve to one end of a length of chain. The other end of the chain carries a fastener member which can be secured to a line or wire or the like for suspending the sensor assembly within a wall. A substantially hollow cylindrical member which serves as a housing for the sensor assembly when the tool is not in use has a magnet fixed within one end thereof. In use, the end of the cylindrical housing member which carries the magnet is inserted through a small hole in the wall to attract the sensor assembly which is suspended within the wall.

4 Claims, 2 Drawing Figures

TOOL AND KIT FOR ELECTRICAL FISHING

BACKGROUND OF THE INVENTION

Electrical fixtures and telephones in dwellings, offices and commercial buildings are very often installed on levels other than that of the power source location, and the running of wire in cavities behind wall finishes or concealed in void spaces of framed partitions is the most commonly accepted method of installation. The installer drills holes or cuts small access openings in the partitions on lower and upper levels, inserts a weighted line in the partition aperture at the upper level, drops the line an approximated distance to the lower level, returns to the lower level and attempts to snare and retrieve the line through the small hole in the lower partition. In the electrical trade, this procedure is commonly referred to as "fishing" or "to fish".

The currently applied methods of fishing for wiring lines depends largely on guesswork and is not a very efficient or easy task, even for the experienced mechanic. Many problems occur with tangled lines, misaligned holes, the need for installer assistance or repetitive trips between levels by the installing mechanic, larger than necessary holes in partitions, poor workmanship, costly repair work, and loss of time and labor.

In an apparent attempt to overcome some of the problems associated with conventional fishing techniques, a fishing device has been proposed which includes a magnet and a magnetically attractable sensor. This device, which is described in U.S. Pat. No. 3,078,073, is not, however, practical for several reasons. Firstly, the magnetic sensor is relatively small. As a result, when the device is being used, the mechanic must know to almost a certainty the exact distance between the hole into which the magnet is placed and the position above the magnet from which the sensor is suspended. If the line suspending the sensor is two or three inches longer than the distance between the lower hole and the attic or other place from which the sensor is suspended, the sensor will not be attracted by the magnet. Instead, the flexible line, which is not attracted to the magnet, will be in the vicinity of the magnet and accordingly the mechanic will have no idea that he is even close to the magnet. Secondly, the magnet of the patented device is mounted in a small holder which is adapted to be secured to a conductor of an electrical cable. After the conductor is screwed onto the magnet holder, the holder and conductor are inserted into the lower hole in the wall. This arrangement may be satisfactory when a relatively rigid cable is used but is totally unsatisfactory when a thin, flexible cable such as a telephone line is being installed. If a thin, flexible wire were attached to the magnet holder and inserted into the hole in the wall, the holder would hang vertically with the magnet facing downwardly in an inoperative position. And thirdly, the patented device, being comprised essentially of two entirely separate parts without a housing or container therefor, makes it difficult to carry in a tool box or the like and makes it possible to easily loose one of these two parts.

The present invention provides a tool which can be used to eliminate or reduce the stated problems now encountered by mechanics in the process of fishing for wiring lines. In addition the use of the invention enables the novice to be as proficient as the experienced mechanic.

One main feature of the invention is to allow the mechanic, while on the upper level, to accurately position the line at the desired location on the lower level, thereby eliminating time consuming guesswork and chance of present methods. Prescribed use of the tool of the present invention enables the mechanic to sense by feeling, and very often by the sound, of parts making contact. Optimum efficiency and certain precision are achieved by the user knowing which part of the sensor assembly is engaged with the magnet. Another main feature of the invention is that much time and labor are saved at the lower floor level, by providing a sensor assembly that can be engaged by the forces of magnetic attraction, manipulated into alignment with and advanced into partition holes having minimized dimensions, and withdrawn for snaring an attached wiring line. With the invention, problems encountered in fishing for electrical wiring lines are substantially eliminated or reduced, with resultant savings in labor and time.

For the purpose of illustrating the invention there is shown in the drawings a form which is presently preferred; it being understood, however, that this invention is not limited to the precise arrangements and instrumentalities shown.

Figure 1:
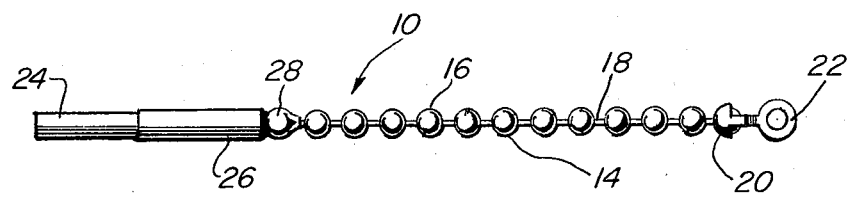
FIG. 1 is a plan view of the sensor assembly of the invention.

Referring now to the Figures in detail there is shown in FIG. 1 a sensor assembly constructed in accordance with the principles of the present invention and indicated generally at 10. Sensor assembly 10 forms one part of the fishing tool kit and is used in conjunction with a second part, a housing assembly, shown in FIG. 2 and indicated generally at 12. As will be explained more fully below, housing assembly 12 has two functions. Firstly, it is used in conjunction with sensor assembly 10 for fishing electrical wires and secondly it forms a housing or container for carrying sensor assembly 10.

The sensor assembly 10, shown in FIG. 1, is comprised essentially of a chain 14 made of a magnetically attractable material. Chain 14 is constructed of a plurality of spherical elements 16 joined together by a plurality of studs 18. A fastener member 20 having a lug element 22 extending therefrom is connected to one end of chain 14. A rod-shaped contactor 24 is secured to the other end of chain 14 by way of a connecting sleeve 26 having a part thereof encompassing part of the contactor 24. Another part 28 of connecting sleeve 26 encompasses the last sphere of chain 14. As with chain 14, the rod-shaped contactor 24 is comprised of a magnetically attractable material. Contactor 24 is preferably however, comprised of a material which exhibits a higher degree of magnetic attractability than the material of chain 14. The material which connecting sleeve 26 is made from may or may not be magnetically attractable. The only requirement being that that part of the sensor assembly 10 encompassed by the connecting sleeve 26 have an attraction to a magnetic force which is less than the magnetic attractabilities of the chain 14 and contactor 24.

Figure 2:
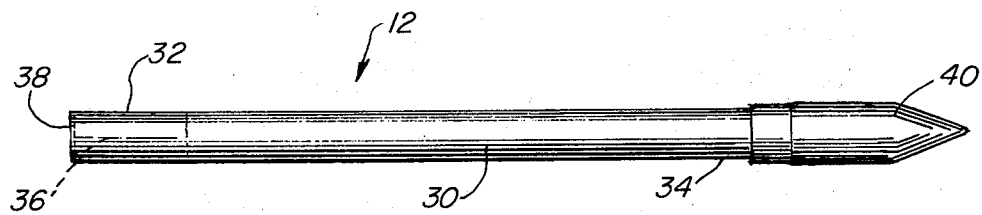
FIG. 2 is a plan view of a housing assembly for the sensor assembly of FIG. 1.

Referring now to FIG. 2, there is shown in this Figure a housing assembly 12 comprised essentially of a substantially hollow cylindrical housing member 30 having a first end 32 and a second end 34. A magnet 36 is inserted into and closes the first end 32 of the housing member 30. Magnet 36 has a base 38 which is exposed adjacent the extreme first end 32 of housing member 30. A removable cap 40 closes the second end 34 of the housing member 30. It should be readily apparent that the housing assembly 12 is constructed so as to contain or house the sensor assembly 10 shown in FIG. 1.

The fishing tool of the present invention is used in the following manner. First the installer makes a hole in the partition or wall on the lower level and inserts the end 32 of the housing assembly 12 to which magnet 36 is affixed. Then the installer makes a hole in the partition at the upper level and inserts the sensor assembly 10 with a flexible line attached, to lug element 22, and lowers it through the void width of the partition toward the magnetic field of magnet 36. The sensor assembly 10 is then manipulated for precise positioning and signals to the installer when proper engagement with the magnet 36 occurs. The desired installation material can be attached to the flexible line or can be used instead of the line. The installer, having returned to the lower level, easily withdraws the housing assembly 12 and attached sensor assembly 10 through the partition and completes the installation.

In the case of misaligned holes, the sensor assembly 10 can be manipulated to swing slowly, in a pendulum-like manner, into the magnetic field and then be snared by the magnet 36.

The sensor assembly 10 is not a magnet, but as described above consists of parts having magnetic properties of varying degrees of sensitivity to the force field of a magnet.

When the chain 14 is attracted to the magnet 36, the sound of contact may be audible and is sensed by the feel of the magnetic pull. As the sensor assembly 10 is drawn through the magnetic field, a hold-release sequence or cyclic variation of magnetic force strength, due to the spherical elements 16 in sequence contacting magnet 36 can be detected by the user as successive elements 16 become more and less attracted to the magnet than the adjacent spherical elements. As the sensor assembly continues to be drawn across magnet 36, the connecting sleeve 26 sustains less magnetic attraction but does not become disengaged from the magnetic force field of the magnet 36. A sliding, smoother than that felt along the chain portion, or a sliding-hold pattern will be detected by the user in addition to hearing a duller contact sound when the connecting sleeve portion is snared by the magnet.

When the magnet 36 engages the contactor 24 of the sensor assembly 10 which has magnetic properties that develop the strongest forces of attraction in the system, a distinctive sound and feel occurs that is different from that of contacting other parts of the sensor assembly. A definite, stronger hold pattern will be detected by the user. Initially the length of the sensor assembly 10 will be perpendicular to the magnet 36 and the hollow tool housing 30. The contactor 24 can be pulled along the base 38 of the magnet 36 and induced to a collinear position with the tool housing 30. When the end of the contactor 24 becomes gripped to the base 38 of the magnet 36 and is aligned with the housing 30, easy withdrawal of the sensor assembly 10 and material attached thereto can be effected.

The present invention may be embodied in other specific forms without departing from the spirit or essential attributes thereof and, accordingly, reference should be made to the appended claims, rather than to the foregoing specification as indicating the scope of the invention.

I claim:

1. A tool for fishing for electrical wires and the like comprising a magnet means and a multi-part sensor assembly; said sensor assembly comprising a chain and a rod-shaped contactor connected to one end of said chain, said chain and said rod-shaped contactor being comprised of magnetically attractable materials and being connected by a connecting sleeve which encompasses part of said contactor and part of said one end of said chain; at least some of the parts of said sensor assembly having differing magnetic properties whereby varying forces are encountered when said sensor assembly is drawn across said magnet means.

2. A tool as claimed in claim 1 wherein said magnet means comprises a cylindrically-shaped substantially hollow housing member having a magnet inserted into and closing one end thereof, said housing member being adapted to house said sensor assembly when said tool is not in use.

3. A tool as claimed in claim 1 wherein said sensor assembly includes a fastener member at the other end of said chain.

4. A tool as claimed in claim 1 wherein said entire sensor assembly is magnetically attractable, that portion of the assembly encompassed by said connecting sleeve being the least magnetically attractable and said contactor being the most magnetically attractable of said parts.

* * * * *